Sept. 8, 1964          V. SACCO          3,147,884
LIQUID DELIVERING AND METERING APPARATUS AND METHOD
Filed June 28, 1961                    5 Sheets-Sheet 1

Inventor
Victor Sacco
by [signature]
Attorneys

Inventor
Victor Sacco
by
Attorneys

Inventor
Victor Sacco
by Rines and Rines
Attorneys

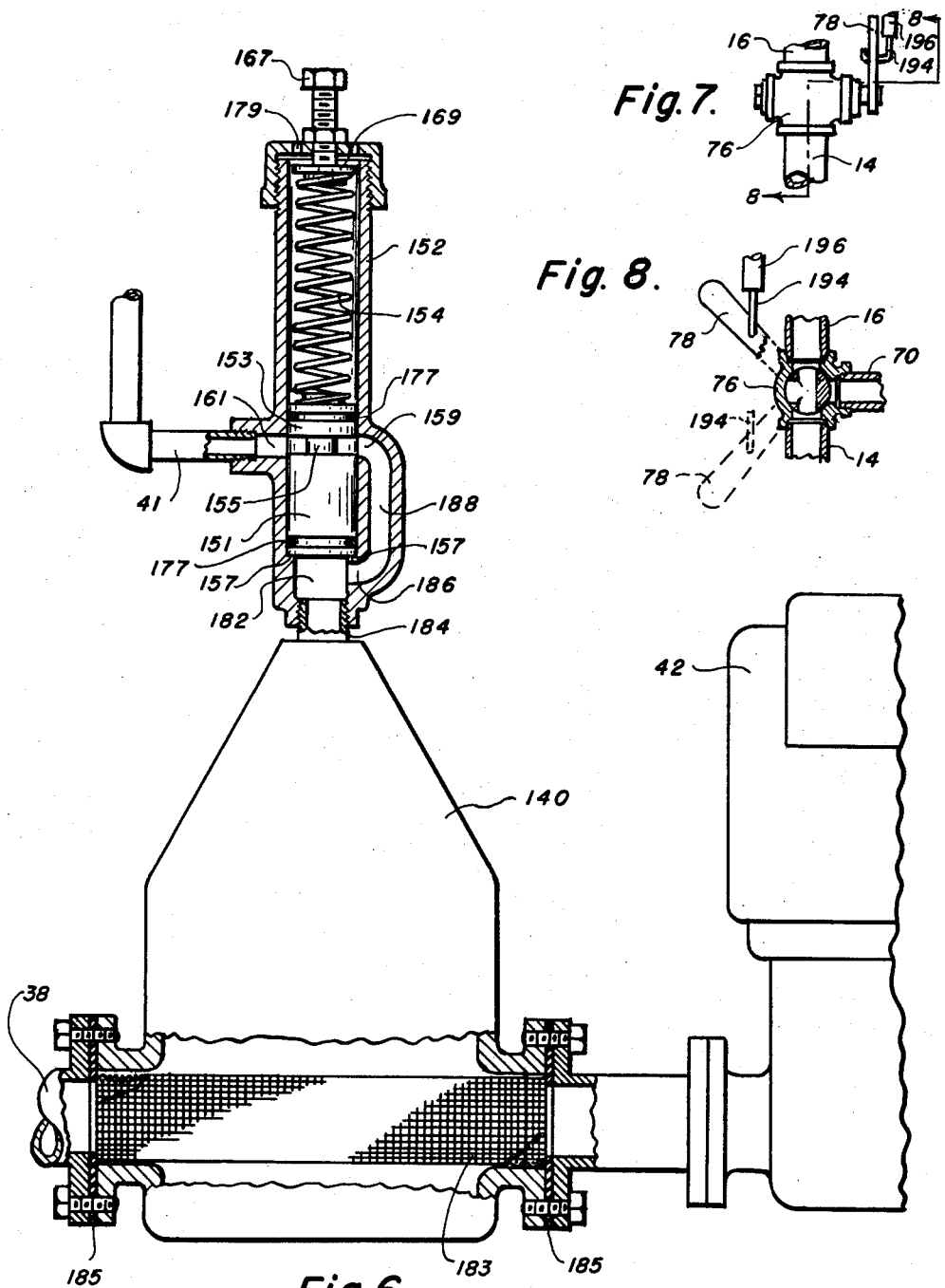

United States Patent Office 3,147,884
Patented Sept. 8, 1964

3,147,884
LIQUID DELIVERING AND METERING
APPARATUS AND METHOD
Victor Sacco, 265 Park Ave., Revere, Mass., assignor of one-half to James Sacco, Saugus, Mass.
Filed June 28, 1961, Ser. No. 120,387
12 Claims. (Cl. 222—1)

The present invention relates to apparatus for and methods of delivering liquid, such as oil, gasoline and the like, and metering the liquid so delivered. The invention relates more particularly to apparatus and methods of this character for delivering oil, gasoline or other liquid from tanks mounted on delivery trucks. The present application is a continuation-in-part of a copending application, entitled, Liquid Delivering and Metering Apparatus and Method, Serial No. 90,545, filed February 20, 1961.

It is customary to deliver oil, for example, from a tank on a delivery truck by pumping it through a hose, that is connected to the outlet of the tank, into the storage tanks of householders and others, for use as fuel. The pump causes the oil to travel also through a meter, which meters the oil thus delivered into the storage tank. When all or nearly all the oil has been delivered out of the tank on the truck, however, air, instead of oil, may become delivered from the tank through the meter. This air, of course, will produce a false reading or erroneous recording of the meter. There is danger of similar false metering occurring in the case of gravity delivery of the oil. For brevity, the term erroneous recording will hereinafter be employed generically to designate such false metering.

It is customary to attempt to provide some protection for the meter against fase or erroneous recordings by interposing an air release, separator or eliminator between the pump and the meter. The function of the air release, air separator, or air eliminator is theoretically to by-pass the air, before it reaches the meter. It is notorious, however, that the air release, separator or eliminator is not reliable, particularly under conditions where large quantities of air, at high velocities, are delivered, as occurs, for example, when the pump continues to pump out of an empty or nearly empty or substantially empty tank.

One well-known type of air release, separator or eliminator, for example, comprises a chamber having an inlet connected to the pressure side of the pump and an outlet connected to the meter. The chamber is provided with a valve disposed above the inlet and the outlet through which air therein is supposed to become eliminated through the action of gravity alone. The valve is normally closed by a float in the chamber, but opens when the liquid in the chamber falls below a predetermined level. Unfortunately, however, air entrained with the liquid pumped through the air release, separator or eliminator travels through the chamber and into the meter before it can escape through the valve thereabove. Control depending upon the level of the liquid in the chamber of the air eliminator, therefore, has been proved to be very unreliable, and air continues to pass through the meter.

An object of the present invention, accordingly, is to provide a new and improved apparatus of the above-described character and a new method that, though protecting the meter against erroneous recordings arising out of the delivery of air therethrough, shall nevertheless not require the use of these float-controlled air eliminators.

The above-described false metering or erroneous recording, with the present-day air eliminators, occurs, of course, under low-pressure conditions, responsive to a substantial amount of air, instead of liquid, issuing out of the tank on the truck. Not only does the present-day air-eliminator fail to protect the meter against erroneous recordings under these low-pressure conditions, moreover, but also it fails to protect the equipment against damage caused by excessively high pressures.

Another object of the invention, therefore, is to protect the apparatus against damage that might otherwise be caused by excessively high pressures of the liquid delivered out of the tank.

A further object is to improve upon and simplify apparatus of the above-described character, with the ends in view of reducing the cost of manufacture, providing for easier installation and, at the same time, improving the efficiency.

Other and further objects will be explained more fully hereinafter and will be more particularly pointed out in the appended claims.

With the above objects in view, a feature of the invention resides in dispensing altogether with the conventional air-eliminator float-controlled valves and the floats for controlling them. The liquid is delivered from the tank on the truck into a pressure system along a main path, to and through the meter, at times when the pressure exerted by the liquid, as the liquid is delivered from the tank, exceeds a predetermined value. A chamber is provided along the said main path, between the pressure system and the meter, which chamber, however, is unprovided with the customary conventional float-controlled valves and the floats for controlling them. When the pressure of the liquid delivered from the tank falls below the predetermined value, the delivery of the liquid is diverted or directed away from the main path, along an auxiliary path. Further delivery of any substantial amount of fluid, whether air or liquid, from the tank on the truck, along the main path, to and through the meter, is thus prevented, and the meter is therefore protected against erroneous recordings.

The auxiliary path of delivery of the liquid from the tank is normally maintained open by a mechanical control apparatus. The particular mechanical control apparatus a preferred embodiment of which is illustrated and described herein comprises a mechanical control member that may be in the form of a piston, and that is normally biased, through spring pressure exerted by a strong controlling spring, to a normal ineffective position in a cylindrical chamber. The mechanical control member becomes actuated out of this normal ineffective position into an effective position, however, and the auxiliary path thereupon becomes closed, in response to the pressure of the liquid itself, as the liquid becomes delivered from the tank. This occurs as soon as this pressure builds up to a predetermined safe value. Thereafter, therefore, the liquid is delivered along the main path, to and through the meter.

In due time, however, the tank will become nearly or wholly or substantially emptied. This, of course, will result in air, instead of oil, becoming now delivered by the pump out of the tank. Becoming thus relieved of the pressure to which it had up to that time been subjected by the liquid pumped out of the tank, the mechanical control apparatus thereupon returns to its normal ineffective condition, thus reopening the auxiliary path of delivery of the liquid from the tank. The liquid will thereafter, accordingly, be pumped out of the tank on the truck along the now open auxiliary path, instead of along the main path, to and through the meter. In this normal ineffective position of the piston, therefore, since no air can be delivered, along the main path, to and through the meter, the meter will thus become protected against erroneous recordings or readings.

According to still a further feature of the invention, however, the auxiliary path may become opened, not only under the low-pressure conditions above described, in order to protect the meter against erroneous recording, but also under conditions of excessively high pressure of the liquid, in order to protect the equipment or the apparatus against damage.

To this end, the before-described piston may comprise two end parts, of diameter substantially equal to the diameter of the cylindrical chamber, and an intermediately disposed part of reduced diameter. In the normal ineffective position of the piston, the part of reduced diameter is aligned with diametrically oppositely disposed perforations in the wall of the cylindrical chamber. The auxiliary path may include these perforations and the space in the cylindrical chamber surrounding the said intermediately disposed reduced part of the piston.

The piston may also, however, occupy an extreme position in the cylindrical chamber such that it may entirely clear the space in the cylindrical chamber between the two diametrically oppositely disposed perforations. In this extreme position of the piston, therefore, the auxiliary path will again become opened through the cylindrical chamber between the said two diametrically oppositely disposed perforations. The liquid under high pressure will, therefore, be delivered along this auxiliary path, instead of along the main path, and the equipment will then be protected against damage that it would otherwise suffer by reason of the excessive pressure exerted by this liquid.

The invention will now be more fully described in connection with the accompanying drawings, in which FIG. 1 is a diagrammatic schematic view, with parts broken away, for clearness, of an oil tank provided with a preferred embodiment of the liquid delivering and metering apparatus of the present invention, the delivery being shown effected by means of a pump;

FIG. 6 is a section similar to FIG. 3 of another form of the preferred embodiment of the invention;

FIG. 7 is a view upon a larger scale, looking in the direction of the arrows 7—7 of FIG. 1;

FIG. 8 is a section taken upon the line 8—8 of FIG. 7, looking in the direction of the arrows.

Figure 9:
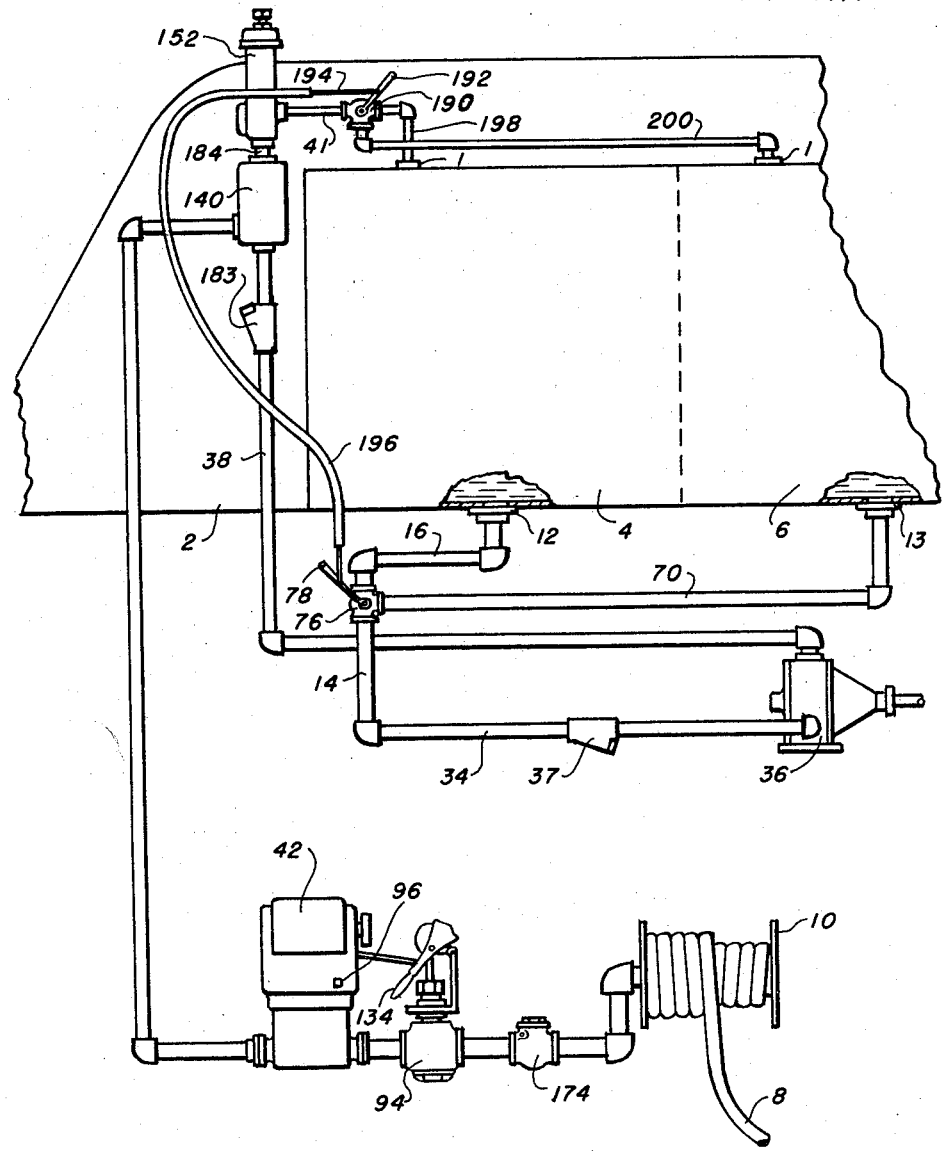
FIG. 9 is a fragmentary side elevation of a truck on which is mounted an oil tank provided with one embodiment of the present invention.

In FIG. 9 there is illustrated a truck 2, upon which is mounted a tank, comprising two tank compartments 4 and 6 for containing the liquid, which may be assumed here, for definiteness, to be oil as described, for example, in Letters Patent 2,980,294 and 2,980,295, issued April 18, 1961, which disclose also further details of construction now old in the art. Each tank compartment may be provided with a vent, which may, for example, be positioned at its dome cover 1, for the entry of air thereinto during the delivery therefrom of the oil contained therein. One end of a delivery hose 8, rolled upon a reel 10, may be connected, as more fully described in the said Letters Patent, to either the circular outlet 12, at the bottom of the tank compartment 4, or to a similar circular outlet 13, at the bottom of the tank compartment 6. The outlets 12 and 13 are shown diagrammatically connected to respective pipes 16 and 70, through which to deliver the oil therefrom. Unlike the drawings of the said Letters Patent, the outlets 12 and 13 are shown always open, as is shown also in the drawings of the said copending application. The connection pipes 16 and 70, in turn, are shown connected to a pipe 14. A nozzle, not shown, at the other or delivery end of the hose 8 is designed to empty into a storage tank, not shown, for an oil burner, not shown, at the home of a householder. The said nozzle of the hose 8 is normally maintained closed; and it is opened, when it is designed to deliver oil therethrough, into the storage tank, by a check or trigger lever, not shown.

By providing the two tank compartments 4 and 6, as described in the said Letters Patent and copending application, provision is made for connecting the suction side of a pump 36, by way of a pipe-connection chamber 34, and a strainer 37, to the outlet 12 or 13 of the tank compartment 4 or 6, promptly after the other tank compartment has become emptied or nearly or substantially emptied. It is desirable, however, that only one of the two tank compartments 4 and 6 be connected to the pump 36 at one and the same time. This result may be attained by connecting both the pipe 16 and the pipe 70, that are respectively connected to the respective outlets 12 and 13 of the tank compartments 4 and 6, to a single two-position manifold or plug or meter valve 76. This two-position valve may be of any suitable type. One such type is illustrated in detail, in FIGS. 7 and 8. By means of a manually operable handle 78, the two-position manifold valve 76 may be connected to either the pipe 16 or the pipe 70. These two positions may be described as the two open positions of the manifold valve 76. In one of these two open positions, illustrated by FIG. 8, the two-position manifold valve 76 connects the pump 36 to the pipe 16, and disconnects it from the pipe 70. In the other open position, not shown, the two-position manifold or plug valve 76 connects the pump 36 to the pipe 70, and disconnects it from the pipe 16. Though there is also a third position of the manifold valve 76, in which it is closed, it will be convenient to refer to the manifold valve 76 as a two-position valve, because it may occupy either of the said two open positions.

The pump 36 will operate to deliver oil from the tank compartment 4 or 6, as the case may be, through the corresponding outlet 12 or 13, and, by way of the connection pipes 16 or 70 and 14, and the pipe-connection chamber 34, into a discharge or pressure pipe system 38, on the compression or pressure side of the pump 36.

According to present-day practice, the pressure-pipe system 38 is connected to a conventional air release, air separator or air eliminator, not shown in the drawings of the present application, that is connected to a meter 42, to which, in turn, is connected a conventional normally closed meter valve 94. These meters are sold, on the market, with the said air release, air separator or air eliminator and the valve 94 annexed thereto, and also with a mechanism for stopping the operation of the meter 42 at a predetermined setting of the meter. The meter valve 94 may be opened by a hand-operated lever 134, and it may be designed to close automatically after the amount of oil has been delivered, through the hose 8, for which the meter 42 has been pre-set. There is shown also a conventional meter trip button 96 for shutting off the delivery of the oil at any time, at will.

According to the present invention, no conventional air release, air separator, or air eliminator is employed. The path of delivery of the oil from the tank compartment 4 or 6 is nevertheless still by way of the pressure system 38, to and through the meter 42, and the meter valve 94. This path of delivery of the oil from the tank compartment 4 or 6 is normally maintained closed, by normally maintaining the meter valve 94 closed. After the meter valve 94 has been opened manually by the lever 134, however, the oil may be delivered from the tank compartment 4 or 6, through the outlet 12 or 13, by way of the connection pipes 16 or 70 and 14, the pipe-connection chamber 34 and the pressure system 38, to and through the meter 42, and the meter valve 94, into the householder's storage tank, not shown. By reason of this travel of the oil through the meter 42, during its delivery from the tank 4 or 6, the meter 42 becomes enabled to meter the oil delivered from the tank 4 or 6.

As already stated, the function of the said conventional air release, not shown in the drawings of the present application, is theoretically to keep air out of the meter 42, thereby to prevent a false or erroneous meter recording or reading. As also before stated, however, the conventional air release does not operate efficiently. After the compartment 4 or 6 becomes empty or nearly or substantially empty, therefore, there is danger that false or erroneous recordings or readings may be obtained in the meter 42.

One reason why present-day air eliminators do not operate efficiently is that the float valves thereof are expected to open in response to their controlling floats dropping by gravity, when air, instead of oil, enters the air-eliminator chambers. It is assumed that the air that thereupon accumulates in the air-eliminator chamber will thus become enabled to escape through float-controlled valves at the upper ends of the air-eliminator chambers. The fact, however, is that this does not work out, in practice; perhaps, for one reason, because the floats do not work positively, but tend continuously to vibrate.

The present invention overcomes all these difficulties by eliminating altogether the float-controlled valves and the floats for controlling them. No conventional air release, separator or eliminator, at all, is employed. A chamber, shown at 140, is used, instead, but no conventional float and no conventional float valve controlled thereby is contained therein. The chamber 140 may still, however, as in present-day practice, be interposed at a point beyond the pressure system 38, between the pressure system 38 and the meter 42, so as to be connectd to the air in the upper part of the compartment 4 or 6, as by means of a vent-line pipe 41, connected to an upper opening 184 of the chamber 140.

Figure 2:
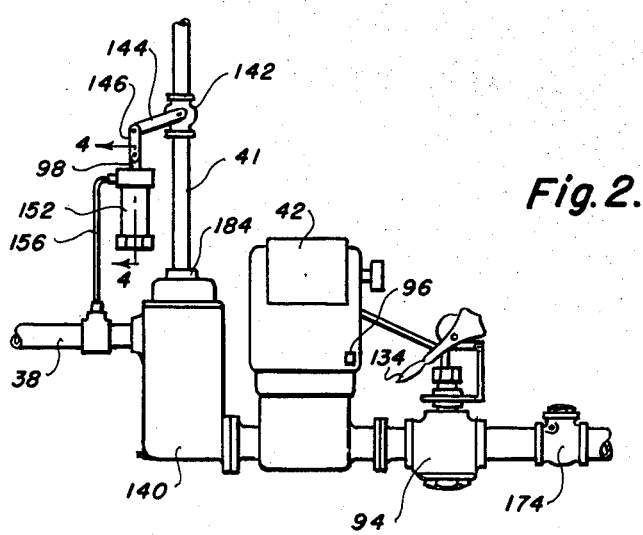
FIG. 2 is a fragmentary schematic view showing another embodiment of the invention.

According to the embodiment of the invention illustrated by FIG. 2, a valve 142 is inserted in the vent-line pipe 41, between the said upper opening 184 and the tank compartment 4 or 6. The valve 142 is under the control of a mechanical control apparatus comprising a control piston 150, shown more particularly in FIG. 4, mounted in the chamber of a cylinder 152 of internal diameter substantially equal to the diameter of the piston 150. A strong coil spring 154, located in the cylindrical chamber 152, at one side of the piston 150, shown as the lower side in FIG. 4, normally biases the piston 150 into engagement with a limiting stop 157. Normally, therefore, the piston 150 occupies an ineffective position in the portion of the cylindrical chamber 152 at the other side of the piston 150, shown as the upper side in FIG. 4. The position of the limiting stop 157 may be adjusted in any desired way, as by means of a washer, not shown. A suitable such cylinder-piston arrangement, for example, is the A-315-ES model of the Airoyal Mfg. Co., 1990 Springfield Avenue, Maplewood, New Jersey.

Figures 4, 5:
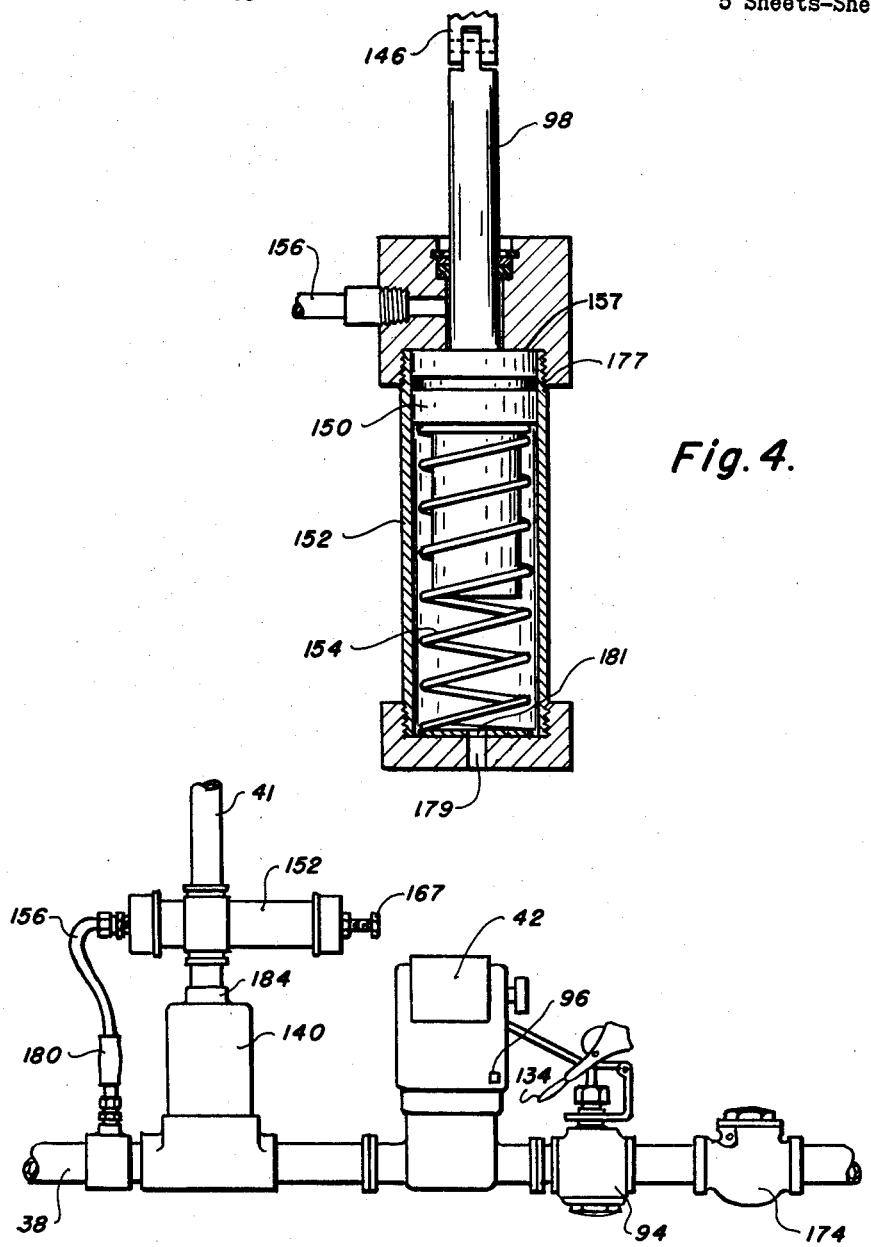
FIG. 4 is a vertical section, upon a similarly larger scale, taken upon the line 4—4 of FIG. 2, looking in the direction of the arrows.
FIG. 5 is a view similar to FIG. 2 of the preferred embodiment of the invention illustrated by FIGS. 1 and 3.

The said upper portion of the chamber of the cylinder 152, as shown more particularly in FIGS. 2 and 4, is connected to the pressure system 38. It is therefore subjected to the pressure of the pump 36 in the path of delivery of the oil from the tank compartment 4 or 6.

A lever 144 that is fixed to the valve 142 is shown linked, at 146, to a projection 98 at the uppermost end of the piston 150, as viewed in FIGS. 2 and 4. At the time of the installation of the apparatus, the lever 144 is positioned so that the valve 142 shall be maintained open at times when the pressure in the pressure system 38 is low. This is the normal condition of the valve 142, and corresponds to the normal, ineffective position of the control piston 150. At the commencement of the operation, when this pressure is naturally low, the valve 142 will be open. It will be maintained open until the pressure in the pressure system 38 builds up, as presently to be described, whereupon it will close. It will then reopen again, under conditions hereinafter more fully described.

In operation, the truck driver will first close the truck switch, not shown, in order to establish the circuits of the truck motor, which is diagrammatically represented at 50. The truck motor 50 may be energized from any suitable source of power, such as a storage battery or a gas engine. The starting of the truck motor 50 may be effected by actuating a conventional manually operated lever, diagrammatically shown at 52, FIG. 1. The pump 36 may then be started, through the medium of a power-take-off 54, under the control of a power-take-off lever 58 or 131, and a link mechanism 60. The power-take-off lever 131 is shown connected to the power-take-off lever 58 by a link 132. Further details of construction may be found disclosed in the said Letters Patent 2,980,294 and 2,980,295.

The pump 36 will now commence to apply pressure to the pressure system 38. The driver of the truck will next open the meter valve 94, by means of the handle 134; he will also manipulate the manually operable handle 78, in order to actuate the manifold or plug valve 76 out of its before-described third or closed position, to which it has been actuated after the last previous delivery of oil, into one or the other of its two open positions; and he will also manipulate the before-described check or trigger lever of the before-mentioned nozzle, not shown, at the delivery end of the hose 8.

The pump 36 will now commence to deliver oil out of the tank compartment 4 or 6, as the case may be. When the pressure builds up to a predetermined value in the pressure system 38, the oil will commence to be delivered from the pressure system 38 into the chamber 140. From the chamber 140, this pressure will now be exerted along two paths.

One of these is the main path before described, namely, to and through the meter 42 and the meter valve 94. The other path is the auxiliary path before mentioned. This auxiliary path may be traced by way of the vent-line pipe 41, through the valve 142, which is at this time in its normally open position, and back into the tank compartment 4 or 6.

There is more resistance to the travel of the oil in this main path than in the auxiliary path, and this resistance is increased by the presence of a customary conventional check valve 174, positioned in the main path of travel of the fluid, beyond the meter 42 and the meter valve 94. Very little, if any, of the oil pumped out of the tank compartment 4 or 6 into the chamber 140, therefore, will be delivered, along the main path, to and through the meter 42. Most of the fluid in the chamber 140 and, indeed, substantially all of it, will be delivered along the auxiliary path, by way of the vent-line pipe 41 and the open valve 142, back into the tank compartment 4 or 6. In effect, therefore, by reason of the fact that the auxiliary path of delivery of the oil from the tank compartment 4 or 6 is normally open, the main path of delivery of this oil, by way of the chamber 140, and to and through the meter 42 and the meter valve 94, is normally effectively closed. Under these normal conditions, the auxiliary path is maintained open by the spring 154, and the delivery of the liquid from the tank compartment 4 or 6 is directed or diverted away from the main path, along the auxiliary path.

The pressure of the oil in the pressure system 38 becomes communicated also, however, by way of a side or branch pipe connection 156, to the portion of the chamber of the cylinder 152 at the extreme upper part of the piston 150, as viewed in FIGS. 2 and 4. As soon as the pump 36 builds up this pressure of the oil to a predetermined value in excess of the force for which the coil spring 154 has been adjusted, therefore, it will actuate the piston 150 downward, in opposition to the biasing force exerted by this spring 154, out of its normal, ineffective position, illustrated in FIG. 4, into its effective position.

In this effective position of the piston 150, through the projection 98 thereof, the link 146 and the lever 144, the normally open valve 142 will become closed. The said normally open auxiliary path of travel of the oil from the tank, by way of the vent-line pipe 41 and the valve 142, back into the tank compartment 4 or 6, will also, therefore, become closed. The pump 36 will accordingly commence to pump the oil out of the tank compartment 4 or 6, by way of the corresponding opening 12 or 13, into the pressure system 38; and from the pressure system 38 along the main path only through the chamber 140 and to and through the meter 42 and the meter valve 94.

The pump 36 will continue thus to pump oil out of the compartment 4 or 6 until that compartment becomes entirely or nearly or substantially emptied. The pump 36 will thereupon commence to pump a substantial amount of air from that tank compartment. The pressure exerted by that air or a mixture of this air and oil upon the upper end of the piston 150, as viewed in FIGS. 2 and 4, will naturally be less than the predetermined value for which the strength of the biasing spring 154 has been adjusted. That spring 154 will therefore restore the piston 150 to its normal ineffective position, shown in FIG. 4, at the extreme upper end of the chamber of the cylinder 152. Through the link 146 and the lever 144, the projection 98, at the upper end of the piston 150, will thereupon effect the reopening of the valve 142. This will result in completely reopening the before-described auxiliary path of delivery of the fluid from the chamber 140, by way of the vent-line pipe 41 and the valve 142. This will therefore result in the effective reclosing, once more, of the before-described main path of delivery. No further fluid, whether air or oil, will therefore thereafter be delivered from the tank compartment 4 or 6, to and through the meter 42 and the meter valve 94. The meter 42 will thus be protected against false readings or erroneous recordings arising out of the delivery of air therethrough.

Since the delivery of the air or the mixture of air and oil pumped out of the empty or nearly empty or substantially empty tank compartment 4 or 6, under the described conditions of pressure below the predetermined value, becomes thus directed away from the main path of delivery to and through the meter 42, along the auxiliary path; since this auxiliary path is open only when the valve 142 is open; and since the opening of the valve 142 is independent of the level of the liquid in the chamber 140 and of the valve-controlling floats of the conventional air release that operate in response to that level; therefore, the operation of the system illustrated by FIGS. 2 and 4, unlike the unreliable operation of the conventional air release, is positive in action and reliable.

The above-described delivery of the oil out of the tank compartment 4 or 6 along the main path of delivery will take place, in opposition to the biasing action of the spring 154, solely in response to the pressure of the oil itself, produced by the pump 36, as it commences to deliver, and, thereafter delivers, the oil out of the tank compartment 4 or 6. It is this pressure of the oil itself that effectively opens the normally effectively closed main path of delivery of the oil from the tank compartment 4 or 6, through the chamber 140, and to and through the meter 42 and the meter valve 94.

It has been found that the apparatus will operate satisfactorily, so as to conform to the tests required by government bodies. The force exerted by the spring 154 upon the piston 150 may be adjusted manually to operate at, for example, average pressures of 20 to 30 pounds per square inch, at times when the two-position valve 76 occupies either of its two open positions. The system, however, may be designed to withstand average pressures of 45 to 55 pounds when it occupies one of its two open positions, and 60 or even 80 to 90 pounds when the two-position valve 76 occupies its closed position. The adjustment may be effected in any desired manner, as by means of an adjustable bolt 167, not shown in FIGS. 2 and 4, but shown in FIGS. 3, 5 and 6. The bolt 167 is shown acting upon a washer 169, interposed between the right-hand ends of the spring 154 and the cylinder 152, as viewed in FIG. 3.

The above operation has been described as taking place without stopping the operation of either the pump 36 or the truck motor 50. These may, therefore, continue to operate without, in any way, introducing errors into the recording of the meter 42. The pump 36 may be protected against injury arising out of excessive pressure caused by its continued operation through the medium of the customary by-pass, not shown, or it may be provided with other safety features known to the art. It is within the scope of the invention, however, to disconnect the truck motor 50 itself from its source of power under the conditions of low pressure before described.

In the system of FIGS. 2 and 4, therefore, the oil is delivered along the main path of delivery to and through the meter 42 when the pressure exerted thereby, as it is delivered from the tank compartment 4 or 6, is of a predetermined relatively high value. The oil is diverted away from this main path, however, along the auxiliary path including the chamber 140, by way of the valve 142 and the vent-line pipe 41, when this auxiliary path is open, back into the tank compartment 4 or 6 when the pressure of the liquid falls below this predetermined relatively high value. This operation, unlike the operation in the present-day air eliminators, takes place irrespective of the level of the liquid in the chamber 140, since it is not dependent upon the action of valves under the control of floats.

It may be observed that the meter valve 94 may be positioned immediately at the left of the meter 42, equally as well as at the right thereof, without impairing the operation. It may not, however, be positioned at the left of the side or branch pipe connection 156, as observed in FIG. 2, for such positioning would subject the meter valve 94 to the travel of the air from the empty or nearly empty tank compartment before such air could reach the control valve 142.

The preferred embodiment of the invention will now be described, with particular reference to FIGS. 1, 3 and 5.

Figure 1:
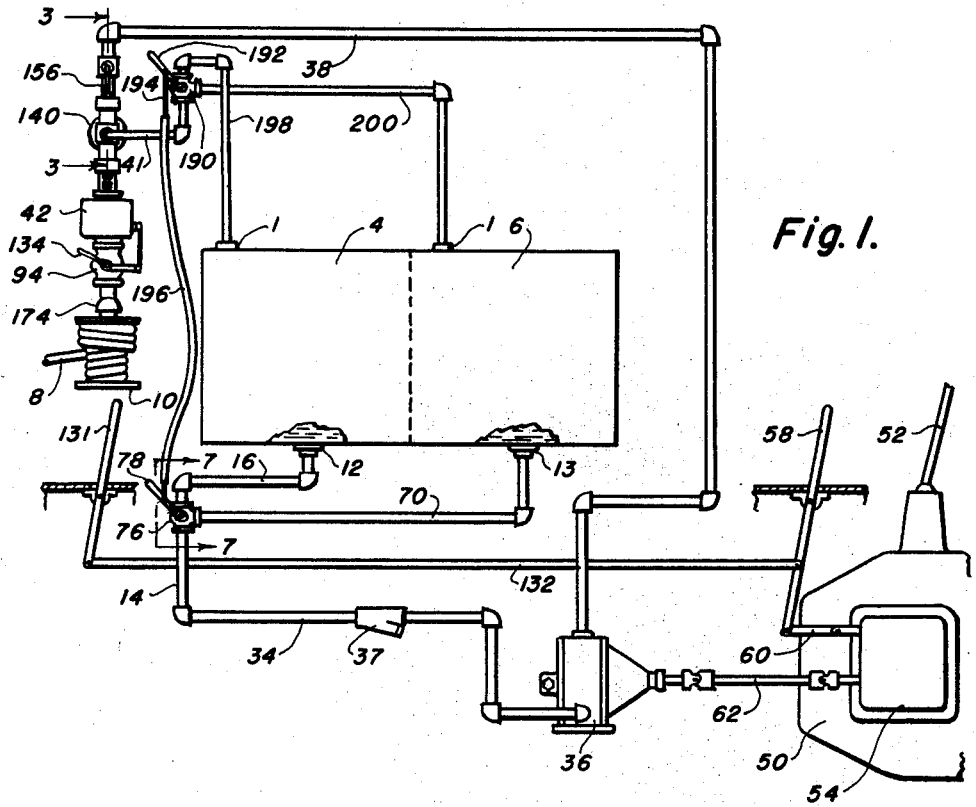
Figure 3:
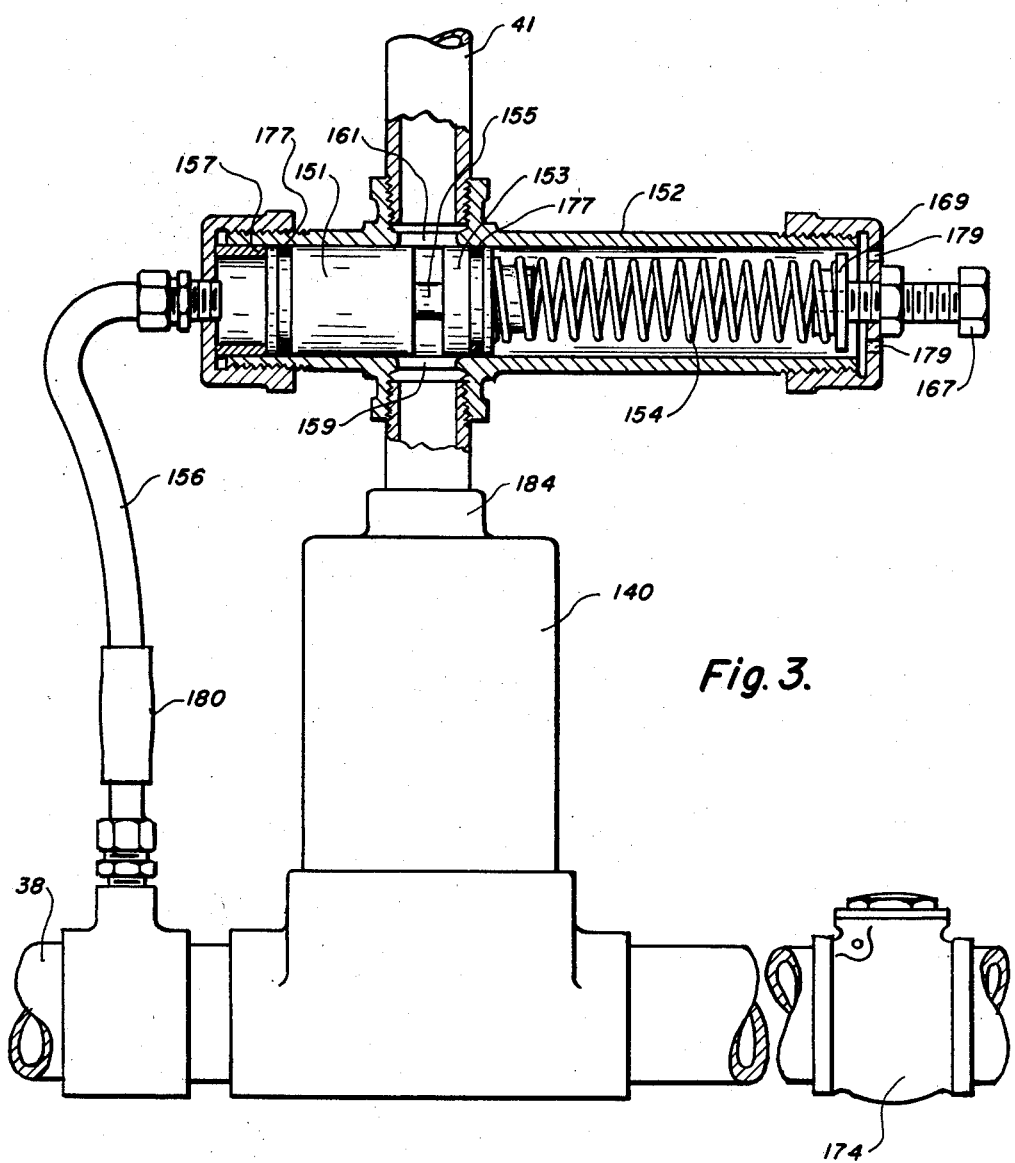
FIG. 3 is a vertical section, upon a large scale, taken upon the line 3—3 of FIG. 1, looking in the direction of the arrows, parts being shown broken away.

In these FIGS. 1, 3 and 5, the piston of the control apparatus is shown comprised of two end parts, 151 and 153, of the same diameter, substantially equal to the diameter of the chamber of the cylinder 152, separated by an intermediately disposed part 155 of reduced diameter. In the normal, ineffective position of the piston 151, 153, 155, it is maintained by the spring 154 against the limiting stop 157, as described heretofore in connection with the embodiment of the invention illustrated by FIGS. 2 and 4. In this normal, ineffective position of the piston, the part 155 thereof of reduced diameter is aligned with diametrically oppositely disposed perforations 159 and 161 in the wall of the cylinder 152. The perforation 159 communicates with the chamber 140, and the perforation 161 with the vent-line pipe 41. In this normal, ineffective position of the piston, therefore, the pressure system 38 communicates with the tank compartment 4 or 6, by way of a path including the chamber 140, the perforation 159, the space in the cylindrical chamber surrounding the portion 155 of reduced diameter of the piston, the perforation 161, and the vent-line pipe 41. Similarly to the terminology employed heretofore in connection with the description of the embodiment of the invention illustrated by FIGS. 2 and 4, this path will be referred to as the auxiliary path of delivery of the fluid from the tank compartment 4 or 6, as distinguished from the main path, to and through the meter 42 and the meter valve 94.

At the commencement of the operation of the delivery of oil by the pump 36 from the tank compartment 4 or 6, since low-pressure conditions prevail, the oil will travel, along this auxiliary path, back into the tank compartment 4 or 6. As already explained, it will choose this auxiliary path of travel, in preference to the main path to and through the meter 42 and the meter valve 94, because this main path offers a higher resistance to such travel; for which reason this main path has been described above as normally effectively closed.

Similiarly to the operation described above in connection with the description of the embodiment of the invention illustrated by FIGS. 2 and 4, however, the oil will travel also from the pressure system 38, by way of the side or branch pipe 156, into the left-hand end of the chamber of the cylinder 152, as viewed in FIGS. 3 and 5. As the pressure builds up, the piston 151, 153, 155 will become actuated to the right, as viewed in these FIGS. 3 and 5, with the result that the part 151 of the piston will shut off the said auxiliary path, by becoming actuated into alignment with the perforations 159 and 161.

Assuming, as before, that the two-position valve 76 has been manipulated, by means of the handle 78, to one of its two open positions, that the meter valve 94 has been opened by means of the lever 134, and that the check or trigger lever, not shown, of the nozzle of the hose 8, has also been operated, the oil will thereupon commerce to be delivered from the tank compartment 4 or 6, through the pressure system 38, along the said main path, through the chamber 140, and to and through the meter 42 and the meter valve 94.

Upon the tank compartment 4 or 6, whichever has been connected to the pump 36, becoming substantially emptied, however, air will begin to be delivered therefrom, whereupon the pressure exerted upon the left-hand end of the chamber of the cylinder 152, as viewed in FIGS. 1, 3 and 5, will become relieved, and the spring 154 will thereupon restore the piston to its normal, ineffective position, in engagement with the limiting stop 157. The auxiliary path will thereupon become reopened, by way of the perforations 157 and 159 and the portion 155 of reduced diameter of the piston, and air from the tank compartment will thereupon become returned into the tank compartment 4 or 6, by way of the vent-line pipe 41.

The systems of these FIGS. 1, 3 and 5 is attended with an additional advantage, moreover, that is not found in the system of FIGS. 2 and 4. It has been stated, in connection with the description of the embodiment of the invention illustrated by FIGS. 2 and 4, that the system may operate at a pressure as high as 80 to 90 pounds per square inch. There are times, however, when the pressure of the oil delivered from the tank compartment 4 or 6 may reach even higher, and excessively high, values, say, 100 pounds per square inch. The continuous vibration, before described, of the floats in the conventional air eliminators is particularly objectionable at high pressures, as it results in damaging many parts of the equipment, including even distant parts like the hose 8, and even the meter 42 itself. According to a feature of the present invention, however, the equipment or apparatus becomes entirely protected against possible damage arising out of such high pressures.

At these excessively high pressures, the piston 151, 153, 155 will become actuated still further to the right, as viewed in FIGS. 3 and 5, until the left-hand end of the end part 151 of the piston becomes actuated beyond, so as entirely to clear, the space of the cylindrical chamber 152 between the perforations 159 and 161. For definiteness, this may be described as the extreme position of the piston. In this extreme position the piston uncovers the perforations 159 and 161 of the wall of the cylinder 152, the same as it does in its normal position before described. The auxiliary path, therefore, becomes thereupon reestablished or reopened, from the pressure system 38, by way of the chamber 140, the perforation 159, the space in the cylindrical chamber 152 thereabove and to the left of the left-hand end of the part 151 of the piston, in this extreme position of the piston, the perforation 161, and the vent-line pipe 41. Along this reestablished auxiliary path, the oil delivered from the tank compartment 4 or 6, at the excessively high pressures, is now permitted, once more, to travel back into the tank compartment 4 or 6. Not until these excessively high pressures become reduced does the spring 154 become enabled to return the piston sufficiently to the left, in order that the part 151 thereof may again become aligned with the perforations 159 and 161, thereby to permit the oil to be delivered, once more, from the tank compartment 4 or 6, along the before-described main path, to and through the meter 42.

According to the embodiment of the invention illustrated by FIGS. 3 and 5, therefore, the oil is delivered from the tank compartment 4 or 6 along the main path to and through the meter 42 when the pressure exerted by the oil, as the oil is delivered from the tank compartment, is between two predetermined values. When the pressure falls below the lower predetermined value, at which air or a mixture of air and oil becomes delivered out of the tank compartment, this air or mixture of air and oil is delivered back to the tank compartment by way of the space in the cylindrical chamber 152 surrounding the intermediately disposed part 155 of reduced diameter of the piston 151, 153, 155 and the vent-line pipe 41. When the pressure, on the other hand, rises to excessive heights above the higher predetermined value, the oil, under these excessive pressures, is returned to the tank compartment along the same auxiliary path in the same space of the cylindrical chamber 152 and the vent-line pipe 41. This time, however, the portion of the auxiliary path in the cylindrical chamber 152 is to the left of the left-hand end of the end part 151 of the piston 151, 153, 155, as viewed in FIGS. 3 and 5. It is only when this piston occupies the additional intermediate position before described between the normal and extreme positions, in which it covers the perforations 159 and 161, in order to close the auxiliary path, that the oil from the tank compartment 4 or 6 is delivered along the main path to and through the meter 42 and the meter valve 94.

The horizontal arrangement of the control apparatus illustrated in FIGS. 3 and 5 is not essential to the practice of the invention. The arrangement may be vertical, as illustrated by FIG. 6. The perforation 159 is shown in FIG. 6 communicating with the upper opening 184 of the chamber 140 by a path including a by-pass 188 in the wall of the cylinder 152. The lower part of the piston 151, 153, 155 is shown provided with a projecting plug 182 for closing off the lower part 186 of the by-pass 188, in the illustrated position of the piston.

In effect, the by-pass 188 and the lower part 186 thereof constitute part, or an extension, of the perforation 159. All these parts, including the perforation 161, indeed, serve the same function, namely, to provide a passage from the chamber 140 along the said auxiliary path. One or more of these parts may, therefore, hereinafter be referred to as perforation means; or, more simply, as a perforation.

The present invention has also further advantages in that it is adapted for simplicity and economy of construction. The piston 151, 153, 155 of FIGS. 3, 5 and 6, for example may be replaced by a piston of uniform diameter, with a hole drilled diametrically therethrough, to align with the perforations 159 and 161. The possibility of this hole becoming misaligned with these perforations 159 and 161 may be eliminated by making the piston of non-circular, flat-sided cross-section, say, for example, square, oblong or even triangular, with the cylinder 152 shaped correspondingly. The piston could also be made of separate parts, instead of integral, as illustrated and described.

The vent line pipe 41 is shown in FIG. 1 connected by an additional two-position valve 190 to the tank compartment 4 by a pipe 198 and to the tank compartment 6 by a pipe 200. This additional two-position valve 190 may preferably, but not necessarily, be of the same type as the two-position valve 76 but it is much smaller as it is not required to handle so great volumes of fluid as the two-position valve 76. This additional two-position valve 190 is shown under the control of a handle 192 operating similarly to the operation of the handle 78. The two-position valves 76 and 190 may be connected together to operate simultaneously or synchronously in any desired manner. They are shown connected together by means of a flexible metal cable 194 contained loosely within a plastic covered or rubber covered flexible metal tube 196. The ends of the flexible metal cable 194 are shown affixed to the respective handles 78 and 192. When, therefore, the handle 78 of the two-position valve 76 is manipulated to connect the pump 36 to the pipe 16 that communicates with the opening 12 of the tank compartment 4, the flexible cable 194 will synchronously or simultaneously operate the handle 192 of the additional two-position valve 190. Then the vent line pipe 41 will be connected by the additional two-position valve 190 so as to vent, by way of the pipe 198, back into the tank compartment 4. When, on the other hand, the two-position valve 76 is manipulated by the handle 78 to connect the pump 36 to the pipe 70 that communicates with the opening 13 of the tank compartment 6, the flexible cable 194 will simultaneously or synchronously operate the handle 192 of the two-position valve 190 so as to connect the vent line pipe 41 by way of the pipe 200 back into the tank compartment 4. Provision is thus made for returning to the respective tank compartments 4 and 6 the precise liquids respectively pumped out therefrom. In situations where the same fluid is contained in the two tank compartments 4 and 6, however, the two-position valve 190 and one of the two pipes 198 and 200 as well as the cable 194 may be omitted. The same applies in cases where there is no objection to mixing the two fluids in the two tank compartments 4 and 6. The additional two-position valve 190 is not necessary of course, when only a single tank compartment 4 is employed.

The invention is obviously also applicable, on the other hand, however, when more than two compartments are employed on the truck 2. The two-position valves 76 and 190 may then be replaced by valves or their equivalents that connect the vent line pipe 41 to as many pipes, like those indicated at 198 and 200, as there are tank compartments to which they may be connected. The flexible cable 194 or its equivalent will be employed to synchronize the operation of these valves in the same manner as before described.

Since air commences to pass out of the tank compartment 4 or 6 before that tank compartment is quite emptied, the air is usually accompanied by a certain amount of oil. This fluid mixture of air and oil, however, offers greater resistance to its return travel into the tank compartment 4 or 6 than would the return of air alone, particularly when the path of this fluid mixture is to some degree, at least, upward.

The efficiency of the apparatus may, therefore, be improved by providing that air alone, or substantially air alone, instead of the fluid mixture of air and oil, shall be returned into the tank compartment 4 or 6. This result may be facilitated, and the resistance to the return travel of the fluid mixture of air and oil into the tank compartment 4 or 6 will be minimized, by raising the cylinder 152, with its associated parts, to such a height on the truck 2 that the vent line pipe 41 shall be above the level of the upper portion of the tank compartment 4 or 6. The effect may be increased, as illustrated by FIG. 9, if no part of the travel of the mixture of air and oil is at any time upward, beginning with the vent line pipe 41. The result may be further facilitated, as also shown in this FIG. 9, by reducing the dimensions of the chamber 140 to substantially those of a mere pipe, which may readily be attained when the apparatus is raised high up on the truck 2, instead of lower down, adjacent to the meter 42.

It has been found that, by proper design, as described above, the meter 42 becomes protected entirely against erroneous recordings. The meter 42 operates to record during the flow of the oil, and it positively does not operate when a fluid mixture of air and oil issues out of the tank compartment 4. There are no intermittent spurts of operation of the meter 42, as would occur if the fluid mixture of air and oil would intermittently sometimes pass along the main path and at other times along the auxiliary path.

Many parts of the mechanism illustrated diagrammatically in the drawings have not been referred to above, or have been mentioned only incidentally. This is because, since their operation is well known, a detailed description thereof is not necessary here. As an illustration, the limiting stop 157 is shown in FIG. 3 in the form of a short section of pipe, which may be of variable length for purposes of adjustment; in FIG. 4, it is shown as a washer, which may be of variable thickness; and, in FIG. 6, it is shown as a ring integral with the inner wall of the cylindrical chamber 152, adjustment being made possible, in the last-named case, by an interposed washer, not shown, of variable thickness. The washer 157 is shown in FIG. 4 provided with a centrally disposed opening 181 that communicates with a similarly centrally disposed vent hole 179 in the lower end wall of the cylindrical chamber 152 for permitting the expulsion of air out of this chamber 152 when the piston 150 becomes actuated downward; and similar vent holes 179 are shown also in the corresponding end walls of the cylinders 150 of FIGS. 3 and 6.

In FIGS. 6 and 9, as still a further illustration, there is shown an additional fine-mesh strainer 183 in or adjacent to the chamber 140, alined with the pressure-system pipe 38, with provision 185, of any well-known type, for removing it for purposes of cleaning. FIG. 6 shows also, for variety, the upper portion of the chamber 140 as preferably cone shaped; it being observed that the branch pipe 156 of FIGS. 1 to 5 is not needed in the system of FIGS. 6 and 9.

As a final illustration the pistons 150 and 151, 153, 155 are shown in FIG. 3 provided with customary sealing O rings 177. These may be of any desired material, suitable for use with liquids of the kind that may be delivered in accordance with the present invention. Suitable such materials, for example, are certain rubbers and certain synthetic plastics, among which may be mentioned polytetrafluoroethylene, marketed under the trademark Teflon, and polyfluorochlorethylene, marketed under the trademark Kel-F.

Further modifications will occur to persons skilled in the art, and all such are considered to fall within the spirit and scope of the present invention, as defined in the appended claims.

What is claimed is:

1. Liquid delivering apparatus comprising a tank for containing the liquid, means whereby the liquid may be delivered from the tank along a main path when the pressure exerted by the liquid, as the liquid is delivered from the tank, exceeds a lower predetermined value but is below a higher predetermined value, means for diverting the delivery of the liquid from the tank away from the main path along an auxiliary path when the said pressure exceeds the higher predetermined value, thereby to prevent the delivery of any further fluid from the tank along the main path when the said pressure exceeds the higher predetermined value, and means for maintaining the auxiliary path open when the pressure exerted by the liquid as the liquid is delivered from the tank is between the lower and the higher predetermined values.

2. Liquid delivering and metering apparatus comprising a tank for containing the liquid, a meter, means whereby the liquid may be delivered from the tank along a main path to and through the meter when the pressure exerted by the liquid as the liquid is delivered from the tank is between two predetermined values, means for diverting the delivery of the liquid from the tank away from the main path along an auxiliary path when the said pressure is outside the predetermined values, thereby to prevent the delivery of any further fluid from the tank along the main path to and through the meter when the said pressure is outside the two predetermined values, and means for maintaining the auxiliary path open when the pressure exerted by the liquid as the liquid is delivered from the tank is between the two predetermined values.

3. Liquid delivering apparatus comprising a tank for containing the liquid, means whereby the liquid may be delivered from the tank along a main path and whereby the delivery of the liquid from the tank may be directed away from the main path along an auxiliary path when the auxiliary path is open, a perforated cylinder having a chamber, a piston in the chamber adapted to occupy a normal position and an extreme position, in both of which positions it uncovers the perforation in the cylinder in order to open the auxiliary path by way of the said perforation, and also an additional position in which it covers the said perforation in order to close the auxiliary path, a spring for biasing the piston to the normal position, and means for subjecting the piston to the pressure exerted by the liquid as the liquid is delivered from the tank to actuate the piston in opposition to the action of the spring out of the normal position in order: first, at a lower predetermined pressure, into the additional position to close the auxiliary path, thereby to prevent the delivery of the liquid from the tank along the auxiliary path when the piston is subjected to the lower predetermined pressure of the liquid; and, secondly, at a higher predetermined excessively high pressure, into the extreme position, in order to reopen the auxiliary path; the spring acting to restore the piston to the normal position in the chamber in order to reopen the auxiliary path upon the pressure to which the piston is subjected falling to a predetermined low value lower than the predetermined lower value, thereby to prevent the delivery of any further fluid from the tank along the main path when the pressure to which the piston is subjected falls to the predetermined low value.

4. Liquid delivering and metering apparatus comprising a tank for containing the liquid, a meter, means whereby the liquid may be delivered from the tank along a main path to and through the meter and whereby the delivery of the liquid from the tank may be directed away from the main path along an auxiliary path when the auxiliary path is open, a cylinder having a perforated wall and a chamber that communicates with the perforation in the wall, a piston in the chamber adapted to occupy a normal position and an extreme position, in both of which positions it uncovers the perforation in the wall of the cylinder in order to open the auxiliary path by way of the said perforation, and also an intermediate position between the said normal and extreme positions in which it covers the said perforation in order to close the auxiliary path, a spring for biasing the piston to the normal position, and means for subjecting the piston to the pressure exerted by the liquid as the liquid is delivered from the tank to actuate the piston in opposition to the action of the spring out of the normal position in order: first, at a lower predetermined pressure, into the intermediate position to close the auxiliary path, thereby to prevent the delivery of the liquid from the tank along the auxiliary path when the piston is subjected to the lower predetermined pressure of the liquid; and, secondly, at a higher predetermined excessively high pressure, into the extreme position, in order to reopen the auxiliary path, thereby to prevent injury arising out of the said predetermined excessively high value of the said pressure; the spring acting to restore the piston to the normal position in the chamber, thereby to reopen the auxiliary path, upon the pressure to which the piston is subjected falling to a predetermined low value.

5. A method of delivering liquid from a tank that comprises delivering the liquid from the tank along a main path, diverting the delivery of the liquid from the tank away from the main path along an auxiliary path, maintaining the auxiliary path closed when the pressure exerted by the liquid as the liquid is delivered from the tank is between two predetermined values, and opening the auxiliary path when the said pressure is outside the two predetermined values in order to prevent the delivery of any further fluid from the tank along the main path when the said pressure is outside the two predetermined values.

6. Liquid delivering and metering apparatus comprising a tank having two tank compartments for containing the liquid, a meter, a pressure system, a two-position valve for connecting the pressure system to one of the tank compartments and disconnecting it from the other tank compartment in one of its positions and for connecting the pressure system to the said other tank compartment and disconnecting it from the said one tank compartment in its other position, means whereby the liquid may be delivered from the respective tank compartments into the pressure system and along a main path to and through the meter when the pressure exerted by the liquid, as the liquid is delivered from the respective tank compartments, exceeds a predetermined value, and means for diverting the delivery of the liquid from the respective tank compartments away from the main path along an auxiliary path back into the respective tank compartments when the said pressure falls below the predetermined value, thereby to prevent the delivery of any further fluid from the respective tank compartments along the main path to and through the meter when the said pressure is below the predetermined value.

7. A method of delivering liquid from a tank having two compartments through a meter and protecting the meter against erroneous recordings arising out of the delivery of air therethrough that comprises delivering the liquid from either one of the tank compartments to an through the meter along a main path while preventing the delivery of the liquid from the other tank compartment, diverting the delivery of the liquid from the said one tank compartment away from the main path along an auxiliary path, back into the said one tank compartment, normally maintaining the auxiliary path open, exerting the pressure of the liquid as the liquid is delivered from the said one tank compartment to close the auxiliary path, and reopening the auxiliary path to prevent the delivery of any further fluid from the said one tank compartment along the main path to and through the meter upon a fall of pressure resulting from the delivery of a substantial amount of air from the tank.

8. Liquid delivering and metering apparatus comprising a tank for containing the liquid, a meter, a meter valve, a check valve, means whereby the liquid may be delivered from the tank along a main path to and through the meter, the meter valve and the check valve when the pressure exerted by the liquid as the liquid is delivered from the tank exceeds a predetermined value sufficient to effect the opening of the check valve and whereby the delivery of the liquid from the tank may be diverted away from the main path along an auxiliary path when the auxiliary path is open, the check valve offering sufficiently greater resistance to the delivery of the liquid from the tank along the main path than along the auxiliary path to effect the delivery of the liquid from the tank substantially along the auxiliary path only and without substantial delivery of any of the liquid along the auxiliary path when the auxiliary path is open, control means adapted to occupy a normal position in which it normally maintains the auxiliary path open in which normal position it is out of the main path in order not to obstruct the delivery of the liquid along the main path, means responsive to the said pressure above the predetermined value for actuating the control means out of the normal position in order to close the auxiliary path, thereby to prevent the delivery of the liquid from the tank along the auxiliary path when the control means is subjected to the said pressure of the liquid above the predetermined value, and means for restoring the control means to the normal position in order to reopen the auxiliary path upon the pressure to which the control means is subjected falling below the predetermined low value when, in response to the delivery of a substantial amount of air from the tank, the check valve becomes closed, in order to prevent delivery of any further fluid from the tank along the main path to and through the meter, thereby to protect the meter against erroneous recordings arising out of the delivery of air through the meter.

9. Liquid delivering and metering apparatus comprising a tank for containing the liquid, a meter, a meter valve, a check valve, means whereby the liquid may be delivered from the tank along a main path to and through the meter, the meter valve and the check valve when the pressure exerted by the liquid as the liquid is delivered from the tank exceeds a predetermined value sufficient to effect the opening of the check valve, and means for diverting the delivery of the liquid away from the main path along an auxiliary path when, upon the said pressure falling below the predetermined value in response to the delivery of a substantial amount of air from the tank, the check valve becomes closed, in order to prevent the delivery of any further fluid from the tank along the main path to and through the meter, thereby to protect the meter against erroneous recordings arising out of the delivery of air through the meter.

10. Liquid delivering and metering apparatus comprising a tank for containing the liquid, a meter, a meter valve, a check valve, means whereby the liquid may be delivered from the tank along a main path to and through the meter, the meter valve and the check valve when the pressure exerted by the liquid as the liquid is delivered from the tank exceeds a predetermined value sufficient to effect the opening of the check valve and whereby the delivery of the liquid from the tank may be diverted away from the main path along an auxiliary path when the auxiliary path is open, a control member, means for biasing the control member to a normal position in which it normally maintains the auxiliary path open, means responsive to the said pressure above the predetermined value for actuating the control member out of the normal position in opposition to the action of the biasing means in order to close the auxiliary path, thereby to prevent the delivery of the liquid from the tank along the auxiliary path when the control member is subjected to the said pressure of the liquid above the predetermined value, the biasing means acting to restore the control member to the normal position in order to reopen the auxiliary path upon the pressure to which the control member is subjected falling below the predetermined value when, in response to the delivery of a substantial amount of air from the tank, the check valve becomes closed, in order to prevent the delivery of any further fluid from the tank along the main path to an through the meter, thereby to protect the meter against erroneous recordings arising out of the delivery of air through the meter.

11. Liquid delivering and metering apparatus comprising a tank for containing the liquid, a pressure system, a meter and a normally closed valve connected to the pressure system, means whereby the liquid may be delivered from the tank into the pressure system and along a main path to and through the meter and the valve when the valve is open and when the pressure exerted by the liquid as the liquid is delivered from the tank exceeds a predetermined value, means for manually opening the valve, means responsive to the pressure exerted by the liquid as the liquid is delivered from the tank for maintaining the valve open, means for diverting the delivery of the liquid from the tank away from the main path along an auxiliary path when the said pressure falls below the predetermined value to a degree such that a substantial amount of air commences to be delivered from the tank and the said pressure consequently falls below the predetermined value, and means controlled by the said fall in pressure for preventing the delivery of any further fluid from the tank along the main path to and through the meter and the valve, thereby to protect the meter against erroneous recordings arising out of the delivery of air through the meter.

12. Liquid delivering and metering apparatus comprising a tank for containing the liquid, a pump, means for connecting the suction side of the pump to the tank in order to cause the pump to deliver the liquid from the tank, a pressure system connected to the pressure side of the pump, a meter and a normally closed valve connected to the pressure system in order that the pump may deliver the liquid from the tank into the pressure system and along a main path to and through the meter and the valve when the valve is open and when the pressure exerted by the liquid as the liquid is delivered from the tank exceeds a predetermined value, means for manually opening the valve, means responsive to the pressure exerted by the liquid as the liquid is delivered from the tank for maintaining the valve open, means for diverting the delivery of the liquid from the tank away from the main path along an auxiliary path when the said pressure falls below the predetermined value to a degree such that the pump commences to deliver a substantial amount of air from the tank and the said pressure consequently falls below the predetermined value, and means controlled by the said fall in pressure for thereupon preventing the delivery of any further fluid from the tank along the main path to and through the meter and the valve, thereby to protect the meter against erroneous recordings arising out of the delivery of air through the meter.

References Cited in the file of this patent

UNITED STATES PATENTS

| | | |
|---|---|---|
| 1,816,821 | Bassett | Aug. 4, 1931 |
| 1,903,332 | Bellar et al. | Apr. 4, 1933 |
| 1,981,507 | Harris et al. | Nov. 20, 1934 |
| 2,276,838 | Grise | Mar. 17, 1942 |
| 2,330,703 | Grise | Sept. 28, 1943 |
| 2,779,503 | Wright et al. | Jan. 29, 1957 |